US008338341B2

(12) United States Patent
Ezzelarab et al.

(10) Patent No.: US 8,338,341 B2
(45) Date of Patent: *Dec. 25, 2012

(54) PROCESS FOR THE PRODUCTION OF A GRANULE OF A COATED OXIDIZING COMPOUND SUCH GRANULE AND USES OF THE GRANULE

(75) Inventors: Mona Ezzelarab, Lund (SE); Carl Aften, Marietta, GA (US); Carolina Andersson, Ängelholm (SE); Cecilia Johansson, Helsinborg (SE); Richard Lalama, Canton, GA (US); Geoffrey Monteith, Midland, GA (US); Lars-Inge Olsson, Ekeby (SE); Ajse Sandqvist, Helsingborg (SE); Frank Schinkel, Hamburg (DE); Markus Svensson, Malmö (SE); Walter Watson, Kennesaw, GA (US); Caroline Wegner, Bjuv (SE)

(73) Assignees: Kemira Kemi AB, Helsinborg (SE); Kemira Chemicals, Inc., Kennesaw, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/738,120

(22) PCT Filed: Oct. 15, 2008

(86) PCT No.: PCT/EP2008/063854
§ 371 (c)(1),
(2), (4) Date: Jun. 9, 2010

(87) PCT Pub. No.: WO2009/050191
PCT Pub. Date: Apr. 23, 2009

(65) Prior Publication Data
US 2010/0248998 A1 Sep. 30, 2010

Related U.S. Application Data

(60) Provisional application No. 60/979,975, filed on Oct. 15, 2007.

(51) Int. Cl.
| | |
|---|---|
| *E21B 21/00* | (2006.01) |
| *E21B 43/00* | (2006.01) |
| *E21B 43/26* | (2006.01) |
| *C09K 8/68* | (2006.01) |
| *C09K 8/60* | (2006.01) |
| *C09K 8/74* | (2006.01) |
| *C09K 8/504* | (2006.01) |
| *B05D 7/00* | (2006.01) |
| *B32B 5/16* | (2006.01) |

(52) U.S. Cl. ........ 507/277; 507/211; 507/219; 507/225; 507/230; 507/269; 507/271; 507/276; 166/305.1; 166/308.1; 166/308.3; 427/213; 428/403; 428/404

(58) Field of Classification Search .................. 507/277, 507/211, 219, 225, 230, 269, 271, 276; 166/305.1, 166/308.1–308.3; 427/213; 428/403, 404
See application file for complete search history.

(56) References Cited

U.S. PATENT DOCUMENTS

| | | | |
|---|---|---|---|
| 4,107,057 | A | 8/1978 | Dill et al. |
| 5,164,099 | A | 11/1992 | Gupta et al. |
| 5,373,901 | A | 12/1994 | Norman et al. |
| 5,624,886 | A | 4/1997 | Dawson et al. |
| 6,380,146 | B1 | 4/2002 | Breel et al. |
| 6,983,801 | B2 | 1/2006 | Dawson et al. |
| 2003/0104967 | A1 | 6/2003 | Jakob et al. |
| 2006/0264334 | A1 | 11/2006 | Gupta et al. |
| 2007/0181510 | A1 | 8/2007 | Harvey et al. |
| 2010/0248998 | A1 | 9/2010 | Ezzelarab et al. |
| 2011/0278008 | A1 | 11/2011 | Andersson et al. |

FOREIGN PATENT DOCUMENTS

| | | |
|---|---|---|
| EP | 0634478 A1 | 7/1993 |
| EP | 0623553 B1 | 7/1997 |
| EP | 0789748 B1 | 4/2000 |
| EP | 0992575 A1 | 4/2000 |
| EP | 1149800 B1 | 4/2007 |
| GB | 1538893 | 5/1976 |
| GB | 2426973 A | 4/2006 |
| JP | 11158016 A | 6/1999 |
| WO | 00/57022 | 9/2000 |
| WO | 0142411 A1 | 6/2001 |
| WO | 2006/114651 A1 | 11/2006 |

OTHER PUBLICATIONS

International Search Report and Written Opinion of the International Searching Authority, or the Declaration, for International application No. PCT/US2008/079932, date of mailing: Dec. 19, 2008, 14 pgs.

*Primary Examiner* — John J Figueroa
*Assistant Examiner* — Atnaf Admasu
(74) *Attorney, Agent, or Firm* — King & Spalding (57) ABSTRACT

The invention provides a process for the production of a granule of a coated oxidizing compound which granule has good delayed release properties, said process comprising a) providing cores of an oxidizing compound produced by fluidized bed spray granulation, b) spraying on the oxidizing compound cores an aqueous solution of metal sili-cate in a fluidized bed, said aqueous solution comprising at least 15% by weight metal silicate, and c) drying to form a metal silicate coating layer on the oxidizing compound core, provided that the amount of metal silicate coating layer is at least 8%, preferably at least 10% by weight based on the total weight of the granule. The invention also provides such granule and well treatment fluids including such granule, and processes for use.

24 Claims, 6 Drawing Sheets

PROCESS FOR THE PRODUCTION OF A GRANULE OF A COATED OXIDIZING COMPOUND SUCH GRANULE AND USES OF THE GRANULE

CROSS REFERENCE TO RELATED APPLICATIONS

This application is a 35 U.S.C. 371 national phase application of PCT International Application No. PCT/EP2008/063854 having an international filing date of Oct. 15, 2008, which claims the benefit of U.S. Provisional Patent Application Ser. No. 60/979,975, filed on Oct. 15, 2007, the disclosures of which are fully incorporated herein by reference. The above PCT International Application was published in the English language and has International Publication No. WO2009/050191A2.

The present invention relates to a process for the production of a granule of a coated oxidizing compound that has good delayed release properties. The invention also relates to such granule and to the use of such granule in well treatment fluids and wastewater treatment processes.

BACKGROUND

Oxidizing compounds, such as peroxygen compounds are widely used in different fields of industries. Perhaps the most commonly known oxidizing compound is sodium percarbonate (SPC), which is a water-soluble crystalline peroxygen compound with the molecular formula $2Na_2CO_3 \cdot 3H_2O_2$. Its theoretical active oxygen content (AO) is 15.28% by weight. Sodium percarbonate dissolves relatively fast in water, releasing sodium carbonate and hydrogen peroxide in the solution. Owing to this property, sodium percarbonate has been widely used as bleaching agent. Applications utilising percarbonate are found in textile bleaching and removal of colored stains from textiles in industry and households in particular. In addition, percarbonate is used in a variety of other applications, including fish farming, soil remediation and oil well stimulation.

Sodium percarbonate involves the problem that, although sodium percarbonate as such is a stable compound, the slight amounts of moisture which are present already in the atmosphere and/or washing agents are sufficient to bring about the decomposition of the percarbonate. As a result, it loses its active oxygen. Especially when stored under warm and humid conditions, sodium percarbonate will decompose alone. To improve the storage stability and to increase safety during transport, percarbonate is normally coated with a thin layer of sodium sulphate (5-10% by weight) with or without the inclusion of boric acid, silicate, carbonates or combinations thereof. Such a coating, when exposed to aquatic media, will dissolve within minutes and release the percarbonate.

Thus, the decomposition of sodium percarbonate can be prevented by coating the sodium percarbonate particles.

U.S. Pat. No. 3,951,838 specifically describes a method for preparing sodium percarbonate by contacting particulate sodium percarbonate with an aqueous sol containing 3 to 8 percent W/V of silica in order to deposit on the percarbonate particles from 1 to 10 percent by weight of silica based on the weight of the percarbonate. The silica sol is obtained by decationizing aqueous solutions of water soluble silicate. This patent does not disclose coating in a fluidized bed let alone with an alkali silicate.

GB Patent 1 538 893 discloses a process for stabilizing a particulate alkali metal persalt, such as sodium percarbonate, comprising coating the persalt with a solid coating agent containing sodium carbonate, sodium sulphate and sodium silicate. This patent specification includes comparison examples where sodium percarbonate particles were coated with a sodium silicate solution to yield a coating in an amount of 2.5 or 5% by weight of the uncoated particles. However, such a coating was not satisfactory.

US 2006/0063693 A1 discloses coated sodium percarbonate particles having a delayed release of active oxygen into an aqueous phase, said particles comprising a sodium percarbonate core, an innermost shell layer comprising an inorganic salt and an outer shell layer comprising an alkali metal silicate which has been prepared by using an aqueous solution containing 2-20% by weight alkali metal silicate. The drawback of such a product is that it is complex comprising a number of various components, and additionally the dilute silicate solution brings along much water which has to be evaporated in the process.

EP 0 992 575 A1 discloses alkali metal percarbonate particles having alkali metal silicate uniformly mixed within the particles and having a coating containing alkali metal silicate. In a granulation step alkali metal silicate is added and mixed uniformly with alkali metal carbonate and stabilizers to obtain particles of a suitable size. The granulation may be performed by compacting, extruding, agglomeration in drum or disk, fluid-bed granulation, prilling or in different kinds of mixers. The coating may be performed by spraying in a drum or fluid bed.

EP 0 789 748 B1 discloses particles having a sodium percarbonate core coated with a silicate and a water soluble magnesium salt, the core and/or coating additionally containing a chelating agent. A preferred coating comprises a first layer, counted from the core, containing the silicate, while a second layer contains the magnesium salt. A preferred magnesium salt is magnesium sulfate.

The silicate is preferably sodium or potassium silicate or a mixture thereof and the amount of the silicate in the coating is preferably from 0.05 to 7% by weight $SiO_2$.

EP 1 149 800 B1 relates to coated granular sodium percarbonate having a multi-coated surface with both inner layer and outer layer, wherein said inner layer comprises a mixture of alkali metal silicate and at least one compound selected from sulfate, carbonate, and bicarbonate of alkali metals and said outer layer comprising a mixture of alkali metal sulfate and at least one compound selected from carbonate and bicarbonate of alkali metals. Coated granular sodium percarbonate containing magnesium salts are disclaimed from this patent. Clearly, this patent discloses complex structures wherein the inner layer comprises alkali metal silicate+another defined component and the outer layer comprises alkali metal sulfate+another defined component.

EP 0 623 553 B1 discloses a stabilized sodium percarbonate particle comprising a sodium percarbonate particle having at least one coating layer thereon, wherein the at least one coating layer comprises: a silicate; magnesium sulfate; and an alkali metal salt selected from the group consisting of alkali metal carbonates, alkali metal bicarbonates and alkali metal sulfates.

The specification describes structures wherein the three components are distributed within two layers, for example in such a matter that the silicate is in the first layer and the magnesium sulfate and alkali metal sulfate in the second layer. Due to the great number of components also these structures are complex.

WO 00/57022 discloses a method for treating an underground reservoir by introducing into the reservoir a treatment fluid comprising an ester and a polymer breaker, such that the ester hydrolyses to produce an organic acid to dissolve acid soluble material present within the reservoir and the polymer breaker degrades polymeric material present in the reservoir. The polymer breaker may be an enzyme or an oxidant, such as persulphate, hypochlorite, peroxide, perborate, percarbonate, perphosphate or persilicate.

U.S. Pat. No. 5,054,552 relates to breaking of high viscosity fluids containing xanthan gums. The disclosed breaker comprises a combination of e.g. sodium percarbonate and ammonium persulfate.

U.S. Pat. No. 4,552,674 discloses an aqueous composition suitable for treating a subterranean formation comprising a hydratable polymer, a peroxygen compound and an activator. The peroxygen compound includes e.g. sodium perborate, sodium percarbonate or hydrogen peroxide.

GB 2 426 973 A discloses a method for removing odours from effluent comprising contacting dewatered effluent with sodium percarbonate granules, wherein the granules are coated with a compound that is sparingly soluble in water. The sodium percarbonate may coated with at least one compound including magnesium silicate, magnesium carbonate, magnesium sulphate, sodium silicate, sodium carbonate, sodium hydrogen carbonate or aluminium silicate. The coating amounts to 0.5 to 25 weight % of coating compound relative to sodium percarbonate. This document teaches that if the number of coating layers is one, the coating amounts to up to 1.5 weight % relative to sodium percarbonate.

JP 11158016 discloses a tablet intended to be placed in the exhaust port of a kitchen sink etc. for preventing formation of slime and having a deodorizing effect. The tablet comprises sodium percarbonate coated with boric acid and/or an inorganic salt, for example with boric acid and water glass, and an organic powder and inorganic powder.

In one aspect, the present invention generally relates to well treatment fluid compositions and methods of use, and more particularly, to well treatment fluids and methods that include a delayed release peroxygen compound formulation.

The internal pressure in an oil well forces only about the first 3 percent to the surface and 10-20% can be acquired by traditional pumping. Gaining access to at least part of the remaining oil requires more advanced technology. In order to gain access, viscous well treatment fluids are commonly used in the drilling, completion, and treatment of subterranean formations penetrated by wellbores. For example, hydraulic fracturing is often practiced as a means to enhance recovery.

During hydraulic fracturing, a viscous well treatment fluid is injected into a well bore under high pressure. Once the natural reservoir pressures are exceeded, the fracturing fluid initiates a fracture in the formation that generally continues to grow during pumping. As the fracture widens to a suitable width during the course of the treatment, a proppant (e.g., sand grains, aluminium pellets, or other material), may then also be added to the fluid. The proppant remains in the produced fracture to prevent closure of the fracture and to form a conductive channel extending from the well bore into the formation being treated once the fracturing fluid is recovered. The treatment design generally requires the fluid to reach a maximum viscosity as it enters the fracture that affects the fracture length and width. The viscosity of most fracturing fluids is generated from watersoluble polysaccharides, such as galactomannans or derivatives thereof. Crosslinking agents, such as borate, titanate, or zirconium ions, are commonly added to increase the fluid viscosity.

Once a suitable amount of fractures are formed, it is generally desirable that the fluid viscosity decrease to levels approaching that of water after the proppant is placed. This allows a portion of the treating fluid to be recovered without producing excessive amounts of proppant after the well is opened and returned to production. The recovery of the fracturing fluid is accomplished by reducing the viscosity of the fluid to a lower value such that it flows naturally from the formation. Incorporating chemical agents, referred to as breakers or breaking agents, into the fluid can accomplish this viscosity reduction or conversion. Typically, these agents are either oxidants or enzymes that operate to degrade the polymeric gel structure.

In choosing a suitable breaker, one may consider the onset of viscosity reduction, i.e., breakage. Viscous well treatment fluids that break prematurely can cause suspended proppant material to settle out before being introduced a sufficient distance into the produced fracture. Moreover, premature breaking can result in a less than desirable fracture width in the formation causing excessive injection pressures and premature termination of the treatment.

On the other hand, viscous well treatment fluids that break too slowly can cause slow recovery of the fracturing fluid from the produced fracture, which delays hydrocarbon production. Still further, the proppant can dislodge from the fracture, resulting in at least partial closing and decreased efficiency of the fracturing operation. Preferably, the fracturing gel should begin to break when the pumping operations are concluded. For practical purposes, the gel preferably should be completely broken within about 24 hours after completion of the fracturing treatment.

In low-temperature wells, enzymatic breaking agents are often used, but they are relatively expensive in comparison to oxidizing breaking agents. In shallow wells, percarbonates are often used, but as the drilling gets deeper percarbonates provide premature breaking and are less preferred.

Accordingly, there is a need in the art for improved breaking agents that can be used in various settings, conditions, and oil well applications.

BRIEF SUMMARY

Disclosed herein is a process for the production of granules of metal silicate-coated oxidizing compound having good delayed release properties. Disclosed herein are also well treatment compositions and processes for use. In one embodiment, a well treatment fluid comprises at least one hydratable polymer; a crosslinker for adjusting a viscosity of the fluid; and granules of an oxidizing compound having a delayed release metal silicate coating.

In another embodiment, a process for fracturing a subterranean formation comprises injecting under pressure an aqueous hydraulic fluid having a first viscosity into a well bore, wherein the aqueous hydraulic fluid comprises at least one hydratable polymer; a crosslinker for adjusting a viscosity of the fluid; and granules of metal silicate-coated oxidizing compound; forming fractures in the subterranean formation with the hydraulic fluid at the first viscosity and dissolving granules of coated oxidizing compound after a period of time; decreasing the first viscosity to a second viscosity with the dissolved granules of oxidizing compound; and recovering at least a portion of the hydraulic fluid having the second viscosity.

In yet another embodiment, a method for purifying wastewater or dewatered wastewater comprises contacting the wastewater or dewatered wastewater with granules of metal silicate-coated oxidizing compound.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION OF THE INVENTION

The present invention is generally directed a granule of metal silicate-coated oxidizing compound that has good delayed release properties, especially to well treatment fluids containing the delayed release oxidizing compound granule for use in oil field applications. As used herein, the term °delayed µ refers to a dissolution profile that retards the release of the oxidizing agent into an object, such as the well treatment fluid or the wastewater. For example, the delayed release oxidizing compound can be used in the drilling, completion, and treatment of subterranean formations penetrated by wellbores. The delayed release coatings of the oxidizing compound granules could provide dissolution times of on the order of a few minutes up to about 5 hours at neutral pHs depending on the intended application.

According to the present invention it has surprisingly been found that an oxidizing compound product having good delayed release properties and that is especially suitable for use in oil field applications and wastewater treatment, can be obtained by forming in a fluidized bed apparatus a relatively thick coating layer comprising metal silicate on oxidizing compound cores.

Thus, according to a first aspect of the invention there is provided a process for the production of a granule of a coated oxidizing compound comprising
a) providing cores of an oxidizing compound produced by fluidized bed spray granulation,
b) spraying on the oxidizing compound cores an aqueous solution of metal silicate in a fluidized bed, said aqueous solution comprising at least 15% by weight metal silicate, and
c) drying to form a metal silicate coating layer on the oxidizing compound core, provided that the amount of the metal silicate coating layer is at least 8%, preferably at least 10% by weight based on the total weight of the granule.

The oxidizing compound is preferably a peroxygen compound. °Peroxygen compounds µ are to be understood as meaning those substances which release active oxygen in the aqueous phase. The peroxygen compound can be selected from the group consisting of perbromate, percarbonate, perborate, perphosphate, persulfate, including mono- and dipersulfate, and persilicate salts and organic peroxides and mixtures thereof. A typical organic peroxide is peracetic acid.

The salts are preferably alkali metal salts, such as sodium or potassium salts.

According to a preferred embodiment of the invention the oxidizing compound core is an alkali metal percarbonate, more preferably sodium percarbonate.

According to one preferred embodiment the cores of sodium percarbonate are produced by fluidized bed spray granulation wherein an aqueous solution of hydrogen peroxide with a hydrogen peroxide content of 30 to 70% and an aqueous solution of sodium carbonate are sprayed in a fluidized bed apparatus. Such as process is described in e.g. EP 0 787 682 A1.

According to a preferred embodiment of the invention the coating layer consists of metal silicate.

The metal silicate may be an alkali metal silicate, an alkaline earth metal silicate or aluminium silicate or a mixture of two or more of these silicates. Preferred alkali metal silicates are sodium and potassium silicate, and preferred alkaline earth metal silicates are magnesium and calcium silicate. The molar ratio of $SiO_2$ to $M_2O$ (M is alkali metal) or $SiO_2$ to $M^1O$ ($M^1$ is alkaline earth metal) is preferably at least 3:1, more preferably at least 3.2:1. A mixture of sodium silicate and potassium silicate is especially preferred. In such a mixture the amount of sodium silicate is preferably from 20 to 80% by weight, more preferably from 30 to 70% by weight, and the amount of potassium silicate is from 20 to 80% by weight, more preferably from 30 to 70% by weight.

Preferably the amount of the metal silicate coating layer is from 8 to 50%, more preferably from 10 to 40%, and most preferably from 15 to 35% by weight based on the total weight of the coated granule.

Preferably the concentration of the aqueous solution of metal silicate is from 15% up to saturation concentration of the solution, preferably at least 20% by weight metal silicate. The aqueous solution of metal silicate may comprise from 20 to 45%, such as from 30 to 40% by weight metal silicate.

When spraying the aqueous solution of metal silicate in the fluidized bed, the bed temperature during spraying and drying is preferably at least 50° C., and more preferably between 65° C. and 105° C., and most preferably between 65° C. and 95° C., such as between 70° C. and 85° C. A typical metal silicate based coating would be performed with an ingoing airflow of 100 to 170 $m^3$/h at a temperature of 85 to 150° C. By way of example, a percarbonate bed of 2 to 3 kg at a temperature of 70 to 105° C. was sprayed at a rate of 0.4 to 4.3 kg/h with a solution of the coating in question diluted to 25-45% by weight.

Preferably the temperature of the aqueous solution of alkali metal silicate to be sprayed is between ambient and 70° C.

The particle size of the uncoated oxidizing compound core may be in the range of 0.3 to 3 mm, preferably 0.4 to 1.5 mm.

According to the invention it is possible to carry out the coating in one or more steps. The multi step procedure is advantageous when forming a thick coating layer, the amount of such a layer preferably being at least 20% by weight based on the total weight of the coated granule.

The coating may be carried out in either continuous or batch wise.

According to a second aspect of the invention there is provided a granule of a coated oxidizing compound obtainable by the above described process.

In a preferred embodiment of the invention the granule of coated oxidizing compound, especially sodium percarbonate comprises a coating layer containing metal silicate in an amount of at least 10% by weight based on the total weight of the granule.

According to a third aspect of the invention there is provided a well treatment fluid, comprising:

at least one hydratable polymer;

a crosslinker for adjusting a viscosity of the fluid; and granules of an oxidizing compound having a delayed release coating, said coated oxidizing compound granule being as defined above.

The well treatment fluid is an aqueous fluid. An optional proppant can be added to the fluid depending on the intended oil field application. The pH of the aqueous fluid can be adjusted to render the fluid compatible with the crosslinking agent. In one embodiment, a pH adjusting material is added to the aqueous fluid after the addition of the water-soluble polymer to the aqueous fluid. Typical materials for adjusting the pH are bases, acids, and buffers. For example, sodium bicarbonate, potassium carbonate, sodium hydroxide, potassium hydroxide, and sodium carbonate are typical pH adjusting agents. In one embodiment pH values for the fluid may range from about 5 to about 14. In other embodiments, the pH is from about 7 to about 14, and in still other embodiments, the pH is between about 8 to about 12.

Suitable hydratable polymers include those that are capable of forming a gel in the presence of a crosslinking agent. Suitable hydratable polysaccharides include, but are not limited to, galactomannan gums, guars, derived guars, and derivatives thereof. Specific examples are guar gum, guar gum derivatives, locust bean gum, Karaya gum, and the like. Suitable hydratable polymers may also include synthetic polymers, such as polyvinyl alcohol, polyacrylamides, poly-2-amino-2-methyl propane sulfonic acid, and various other synthetic polymers and copolymers. Other suitable polymers are known to those skilled in the art.

The amount of hydratable polymer in the fluid is not intended to be limited. Generally, the polymer may be present in the fluid in concentrations ranging from about 0.10% to about 5.0% by weight of the aqueous fluid. A preferred range for the hydratable polymer is about 0.20% to about 0.80% by weight.

A suitable crosslinking agent can be any compound that increases the viscosity of the fluid by chemical crosslinking, physical crosslinking, or any other mechanisms. For example, suitable crosslinking agents include borates such as boric acid, sodium metaborate, sodium tetraborate and the like; titanates such as titanium chelate esters; dialdehydes; zirconium containing compounds and various mixtures thereof. Other suitable crosslinking agents will be well within the skill of those in the art. The selection of an appropriate crosslinking agent generally depends upon the type of treatment to be performed and the hydratable polymer to be used. The amount of the crosslinking agent used also depends upon the well conditions and the type of treatment to be effected, but is generally in the range of from about 10 ppm to about 1000 ppm of metal ion of the crosslinking agent in the hydratable polymer fluid. In some applications, the aqueous polymer solution is crosslinked immediately upon addition of the crosslinking agent to form a highly viscous gel. In other applications, the reaction of the crosslinking agent can be retarded so that viscous gel formation does not occur until the desired time.

The hydratable polymer, independently or in combination with the crosslinking agent is present in the fluid at concentrations effective to provide a viscosity greater than 1000 cP at 3.77 sec$^{-1}$.

The delayed release oxidizing compound granule is formed from oxidizing compound cores in a fluidized bed by spraying an aqueous solution of metal silicate as explained above in more detail.

The internal stability of oxidizing compound granules can be followed by analyzing the activity at intervals by measuring the TAM (Thermal Activity Monitoring) value, wherein the stability increases with decreasing TAM value. A good storage life is indicated by a low TAM value. For some applications, the TAM value should preferably be below about 15 $\mu$W/g and in particular below about 10 $\mu$W/g for oxidizing compound. The TAM value is a microcalorimetric analysis of the energy released during storage, measured by means of the TAM® Thermal Activity Monitor from Thermometric AB (Sweden). As the oxidizing compound degrades, it gives off heat. The flow of this heat is measured, as a TAM value in $\mu$W/g.

Well stimulation and completion (treatment) fluid compositions of the present invention can further comprise other additives. Additives are generally included to enhance the stability of the fluid composition itself to prevent breakdown caused by exposure to oxygen, temperature change, trace metals, constituents of water added to the fluid composition, to prevent non-optimal cross linking reaction kinetics, to protect oilfield equipment, and to prevent the growth of bacteria. The choice of components used in fluid compositions is dictated to a large extent by the properties of the hydrocarbon-bearing formation on which they are to be used. Such additives can be selected from the group consisting of water, oils, salts (including organic salts), cross linkers, polymers, biocides, corrosion inhibitors and dissolvers, pH modifiers (e.g., acids and bases), breakers, metal chelators, metal complexors, antioxidants, wetting agents, polymer stabilizers, clay stabilizers, scale inhibitors and dissolvers, wax inhibitors and dissolvers, asphaltene precipitation inhibitors, water flow inhibitors, fluid loss additives, chemical grouts, diverters, sand consolidation chemicals, proppants, permeability modifiers, viscoelastic fluids, gases (e.g. nitrogen and carbon dioxide), and foaming agents.

According to a fourth aspect of the invention there is provided a process for fracturing a subterranean formation comprising:

injecting under pressure an aqueous hydraulic fluid having a first viscosity into a well bore, wherein the aqueous hydraulic fluid is a well treatment fluid as defined above, i.e. comprising at least one hydratable polymer; a crosslinker for adjusting a viscosity of the fluid; and granules of an coated oxidizing compound granules;

forming fractures in the subterranean formation with the hydraulic fluid at the first viscosity and dissolving the granules of the coated oxidizing compound after a period of time;

decreasing the first viscosity to a second viscosity with the dissolved granules of the oxidizing compound; and recovering at least a portion of the hydraulic fluid having the second viscosity.

According to a fifth aspect of the invention there is provided a method for purifying wastewater or dewatered wastewater comprising contacting the wastewater or dewatered wastewater with granules of a coated oxidizing compound as defined above.

Such a treatment especially removes odors from the wastewater.

The coated oxidizing granules could be applied to the waste water treatment plant at the desired point of odor control. Typically the point of application could be to sludge like that from screens, before the primary sedimentation, before the secondary treatment or before the thickening tanks. As oxygen is released it can be advantageous to apply the granules before the secondary treatment.

Alternatively the point of application may be to the sludge storage tanks before dewatering or before dewatering equipment. Finally the coated granules may also be applied to the external septic sludge or external organic material.

Additionally the invention relates to the use of granules of a coated oxidizing compound as defined above in the fields of well treatment fluids and wastewater treatment.

The following examples are presented for illustrative purposes only, and are not intended to limit the scope of the invention. In this specification the percentage refers to percent by weight unless otherwise specified.

EXAMPLES

Examples 1 to 10 relate to the preparation of coated sodium percarbonate in laboratory scale.

Examples 11 to 14 relate to the preparation of coated sodium percarbonate in full scale.

Examples 15 and 16 relate to the use of coated sodium percarbonate in oilfield applications.

Examples 1 to 10

Laboratory Trials

Raw Materials

Sodium percarbonate, SPC, (Kemira Kemi AB under trade name ECOX U from regular production) was used for the coating trials.

Alkali silicate of different molar ratios and dry content were used. In the examples given below one of the following was used:

Sodium silicate from Askania Sweden with a dry content of 36 wt % and a molar ratio (MR) of 3.3+/−0.2.

Sodium silicate from Cognis Germany with a dry content of 30 wt % and a MR of 4.0+/−0.1.

Sodium silicate from Silmaco, Germany, 45 wt % dry content, and MR 2.0.

Potassium silicate from Askania Sweden, with a dry content of 34 wt % and a MR of 3.4+/−0.1.

When mixtures of potassium silicate and sodium silicate of MR 3.3 were used the approximate final molar ratio of the mix was $SiO_2:Na_2O:K_2O$ 10.2:2.1:1.0.

When mixtures of potassium silicate and sodium silicate of MR 4 were used the approximate final molar ratio of the mix was $SiO_2:Na_2O:K_2O$ 8.5:1.3:1.0.

In some trials the silicate was diluted with water.
Analysis
Dissolution Time

The Dissolution time was measured by conductivity, with a Cond 340i, WTW on 2 g sample in 1 l of deionised water at 20° C. The sample was stirred at ~750 rpm throughout the measurement. The rate of dissolution is given graphically or as the time (min) at 90% of the maximum obtained conductivity (standard for ECOX) or as the reached conductivity at a specific time. The silicate itself contributes to the conductivity but for comparative purposes the method is useful.
Stability Thermal stability was analyzed by calorimetric measurements at 40° C. on a 2277 Thermal Activity Monitor, 4-channel micro-calorimetric system from Thermometric AB (Sweden). Unless otherwise mentioned, the TAM-value is the measured heat flux in mW/kg after twenty four hours. The sample amount was 4 gram.

Si Content

The silicate content in the coating was measured with Perkin-Elmer 4300v ICPoes in a dilute $HNO_3$ solution. About 10 g sample is grinded and a smaller amount thereof is analyzed.
Caking Caking tendency was determined as follow. 80 g of sample was placed in a plastic bag with 4 holes made by puncturing the bag with a needle. The bag was stored at 30° C. and 70% RH under the pressure of 10 m water column/$cm^2$ for 96 h. The result is presented as the weight % of lumps per sample.
Active Oxygen Active oxygen (AO) of the hydrogen peroxide content was determined by titration with potassium permanganate (0.2 N) in 10% sulphuric acid. About 5 g sample is dissolved in 75 ml 10% $H_2SO_4$ solution. The titration was performed with a Metrohm 794 Basic Titrino, Metrohm 665 Dosimat and a combined Pt-electrode.
Moisture 10 g of sample was stored at 60° C. for 3 h in heating chamber. The moisture content was determined as the weight change.
Bulk Density A controlled free fall of about 0.6 litre sample down to a 0.502 litre open vessel. Sample surface is evened gently and the vessel is weighed.
Attrition Attrition or friability of the granules was measured as the increase in the amount of fine particles using a V-formed rotating tube with five ceramic balls; 200 g sample is rotated for 10 min at 30 rpm. The generated fine particles below fraction <250 μm give the amount of attrition.
Lab Scale Trials Sodium percarbonate granules (ECOX U) were coated with different types of coating at various thicknesses in order to evaluate how much it would be possible to delay the release of the H2O2. The samples were prepared by fluidized bed coating and the dissolution time of the coated granules was used as a measurement of how much the release could be delayed.

The coatings of the sodium percarbonate granules (ECOX U) were performed in an AGT 150 fluid bed from Glatt (Germany).

Typical silicate coating trials were performed with ingoing air flow of 100-170 $m^3$/h with temperature of 85-150° C., ECOX bed of 2-3 kg with bed temperature of 70-105° C., 25-45% water glass solution at a spraying rate of 0.4-4.3 kg/h. A drying sequence was used in some trials.

In trials with mixture of sodium and potassium silicate the potassium silicate was mixed with sodium silicate in a ratio of 40:60 as is and the final dry content was about 35 wt %. In some cases this mixture was diluted to 25%.

The silicate coating amount was calculated as the sum of $Na_2O$ and $SiO_2$ (Equations 1-3).

Si content by analysis 10% (10 g/28.1 g/mol)*60.1 g/mol=21.4 g $SiO_2$      Eq. 1

Water glass contains $Na_2O$: 8.77 wt %, SiO2: 27.85 wt % (21.4/27.85)*8.77=6.7 g $Na_2O$      Eq. 2

21.4 g+6.7 g=28 g $Na_2SiO_3$=28% $Na_2SiO_3$      Eq. 3

The samples were coated with a theoretical value from 10% to 50% $Na_2SiO_3$.

The process parameters for each test and the results of the tests are provided in Table 1. The stability of coated samples of Examples 1-3 over time are provided in Table 2.

The stability for each coating was measured as the heat flow over time and the measurements after 24 h (TAM-values) were used for comparing the stability between samples. Additional TAM analyses were performed two and seven month after the first measurement (Table 2). The water glass coated samples had a decreased TAM-value and comparable hydrogen peroxide content to the first measurement. This indicates a very stable coating. The hydrogen peroxide contents of the Si-coated samples were found at expected levels.

The silicate coated samples did not show increased caking tendency (Table 1), nor did they show increased attrition compared to uncoated samples.

Figure 4:
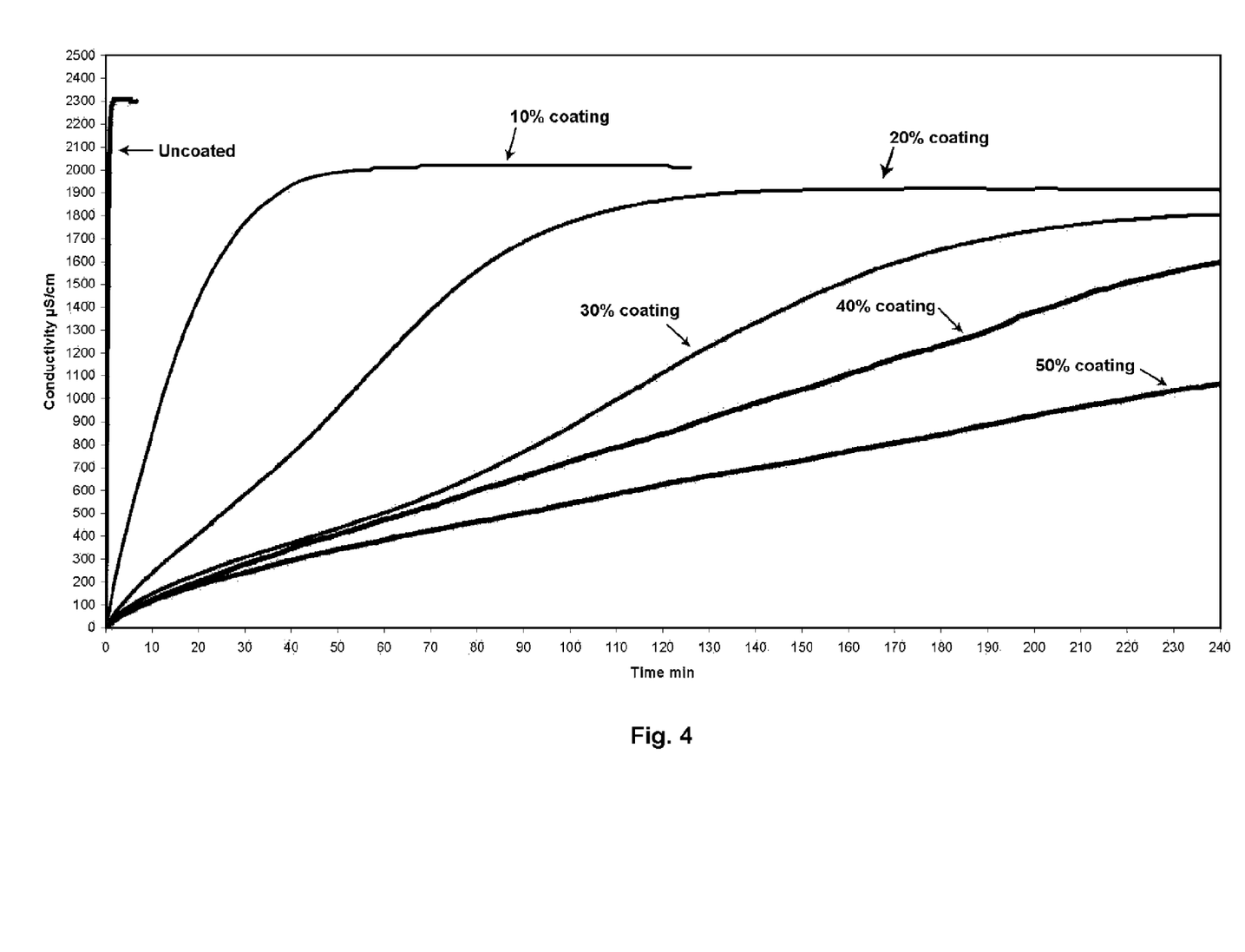
Figure 5:
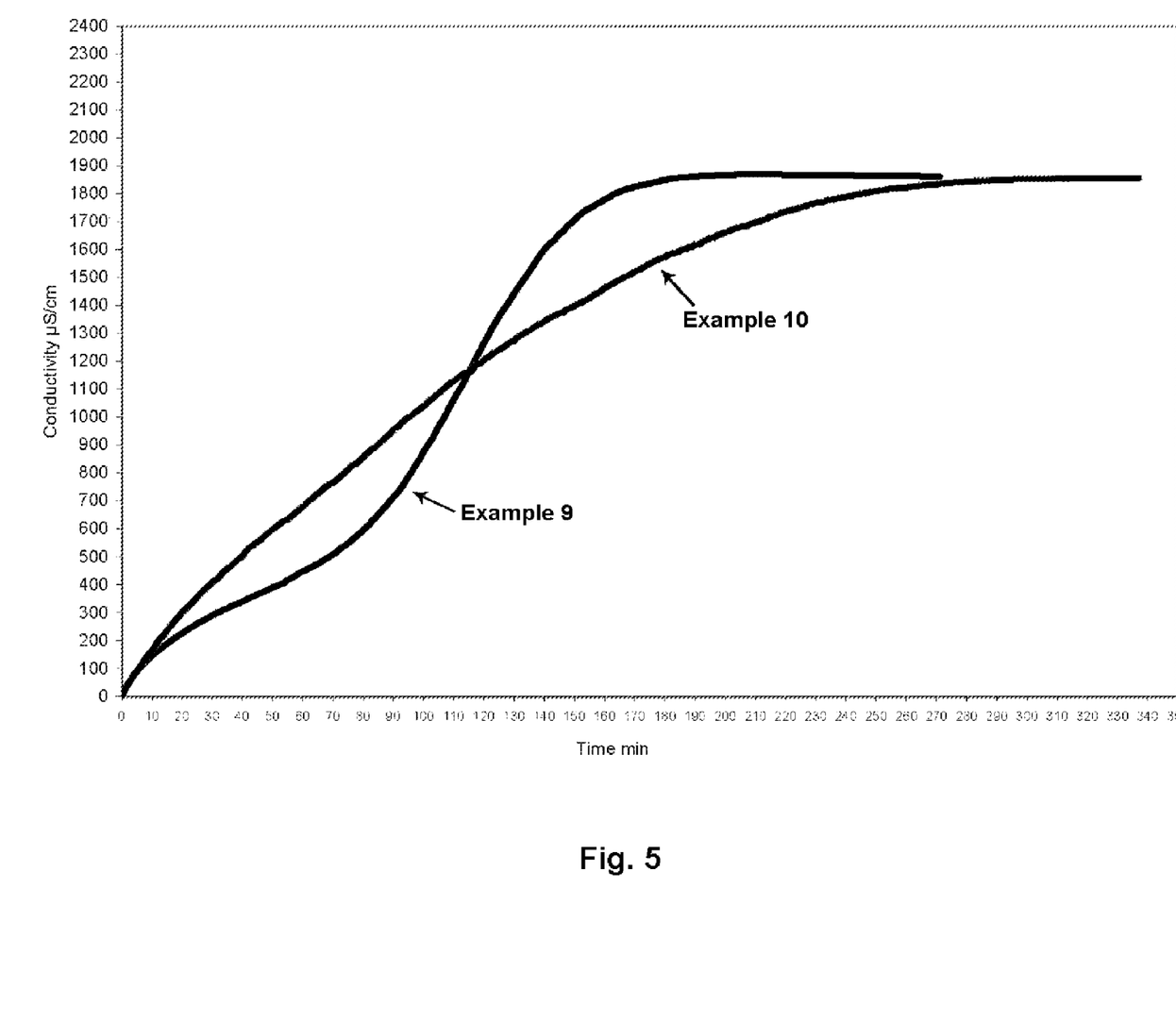

FIG. 4 graphically illustrates the dissolution profile of sodium silicate-coated sodium percarbonate granules at about 20° C. with 10%, 20%, 30%, 40% and 50% sodium silicate coating as a function of time, and FIG. 5 graphically illustrates the dissolution profile of NaK silicate-coated sodium percarbonate granules prepared in Examples 9 and 10 at about 20° C. as a function of time.

The dissolution time for the uncoated samples was seconds. The results clearly show that the dissolution time of sodium percarbonate is significantly extended when coated with a sodium silicate coating or a sodium-potassium silicate coating.

TABLE 1

| Sample # | Process parameters | Coating Calculated coating % | Si (wt %) | Dissol. (min) | TAM-value (µW/g) | H2O2 content (%) | Attrition % | Caking (wt %) |
|---|---|---|---|---|---|---|---|---|
| ECOX U | | Uncoated (ref1) | | 1.1 | 1.0 | 31.5 | | |
| ECOX U | | Uncoated (ref2) | | 0.9 | 4.5 | 31.2 | <0.5 | |
| | Coating solution at ambient temperature with sodium silicate of MR 3.3 unless otherwise stated | | | | | | | |
| Ex. 1 070405-61 | Bed 85° C., inletair 125-135 m3/h, 110-120° C. | Na$_2$SiO$_3$ 10% | 3.6 | 33 | 2.4 | 27.9 | | |
| Ex. 2 070404-62 | Bed 85° C., inletair 155 m3/h, 125-135° C. | Na$_2$SiO$_3$ 30% | 10 | 173 | 3.4 | 21.1 | | 0 |
| Ex. 3 −99 | Bed 83° C., inletair 125-135 m3/h, 125° C. | Na$_2$SiO$_3$ 30% | 10 | 181 | 4.5 | 21.0 | <0.5 | 0.9 |
| Ex. 4 −116 | Bed 100° C., inletair 125 m3/h, 135° C. | Na$_2$SiO$_3$ 40% | 12 | 255 | 4.8 | 15.9 | | |
| Ex 5 070613-117 | Bed 100° C., inletair 125 m3/h, 130° C., 60° C. spraying solution | Na$_2$SiO$_3$ 50% | 18 | 278 | 4.7 | 11.0 | — | 2.2 |
| Ex 6 080425-188 | Bed 83° C., inletair 115-120 m3/h, 120° C. | Na$_2$SiO$_3$ 20% | 7.1 | 100 | 3.7 | 23.4 | | |
| Ex 7 070912-195 | Bed 70° C., inletair 120 m3/h, 100° C., 60° C. spray solution | Na$_2$SiO$_3$ 30 wt % | 11 | 135 | 4.1 | 22.0 | | |
| Ex 8 071113-229 | Bed 75° C., inletair 170 m3/h, 120° C., 25 wt % sol. | Na$_2$SiO$_3$ 25% | 8.9 | 157 | — | 21.9 | | |
| Ex 9 071211-257 | Bed 83° C., 25 wt % sol. inletair 170 m3/h, 120° C. Sodium silicate MR3.3:potassium silicate mix 60:40 | SiO2:Na2O:K2O 25% | 2.1 | 9.1 | 3.9 | 22 | 150 | |
| Ex 10 071217-259 | Bed 85° C., 33 wt % sol. inletair 170 m3/h, 120° C. Sodium silicate MR 3.9:potassium silicate mix 60:40 | SiO2:Na2O:K2O 25% | 2.2 | 8.9 | 3.7 | 202 | | |

TABLE 2

| Sample # | Coating (%) | TAM (µW/g) Initial | TAM (µW/g) 2 month | TAM (µW/g) 7 month | H2O2 content (%) Initial | H2O2 content (%) 2 month | H2O2 content (%) 7 month |
|---|---|---|---|---|---|---|---|
| Ex. 1 | Na$_2$SiO$_3$ 10% | 2.4 | 1.4 | 1.3– | 27.9 | 28.0 | 27.4 |
| Ex. 2 | Na$_2$SiO$_3$ 30% | 3.4 | 1.3 | n.a. | 21.1 | 21.7 | n.a |
| Ex. 3 | Na$_2$SiO$_3$ 30% | 4.5 | 3.1 | 2.8 | 21.0 | 20.7 | 20.1 |

Examples 11 to 14

Full Scale Trials

The same raw materials as in Examples 1 to 9 were used.
The coater used was a batch fluid bed reactor FBC 5000 from Glatt. A typical batch size is between 3000·4000 kg of sodium percarbonate granules.

The water glass was used as received in Examples 11, 12 and 13. In Example 14, a diluted water glass solution was used.

Example 11

3600 kg uncoated percarbonate granules at a bed temperature of 78° C. were coated with 20 wt % waterglass. The ingoing air temperature was 115° C. The trial was done in one step. 2600 L water glass was sprayed. The silicate content was determined to 7.6+/−0.2%. Calculated as Na2SiO3-coating this corresponded to 21.3+/−0.7%. The conductivity at 20 min and 120 min was 643+/−58 µS/cm and 1805+/−26 µS/cm respectively. The bulk density was determined to 0.98+/−0.01 kg/L. TAM value was 2.6 mW/kg. The hydrogen peroxide content was determined to 23.6+/−0.1% H2O2. Viscosity reducing effect analysis test showed that it could be suitable for well treatment.

Example 12

Example 12 was done the same way as Example 11 to verify repeatability of the process in full scale. The product properties and the dissolution were close to Example 11 which confirms the repeatability of the process.

Example 13

Example 13 was done the same way as Example 11 except that a 15+wt % coating was aimed for. The coating content was as intended and the dissolution performance was accordingly faster than in Examples 11 and 12.

Example 14

Compared to Example 11 the spraying solution was diluted, the ingoing air temperature was 120° C. The dilution gave as intended a positive effect with a slower dissolution performance. The performance was close to a 25% lab coated product, which also was coated with a diluted solution. Bulk density was slightly higher for this product compared to the other trials. The PSD was normally distributed with the mean in 0.71-1.0 mm, comparable to lab sample.

All full scale trials were stable from a process perspective and intended coating level was reached. All samples had low TAM-values and moisture content which ensures a stable product and the hydrogen peroxide content were as expected.

The analysis results of full scale trials of Examples 11·14 are provided in Table 3.

TABLE 3

| Description | Si wt-% | Calculated coating as % Na2SiO3 | Bulk Density kg/l | H2O2 %, 5 h | Moisture % 3 h, 10 g, 60° C. | TAM mW/kg 24 h |
|---|---|---|---|---|---|---|
| Example 11 | 7.6 | 21 | 1.0 | 24 | <0.05 | 2.6– |
| Example 12 | 7.2 | 20 | 1.0 | 23 | <0.05 | 2.8– |
| Example 13 | 5.9 | 16 | 1.0 | 24 | <0.05 | 2.6– |
| Example 14 | 7.1 | 20 | 1.1 | 23 | <0.05 | 2.1– |

Figure 6:
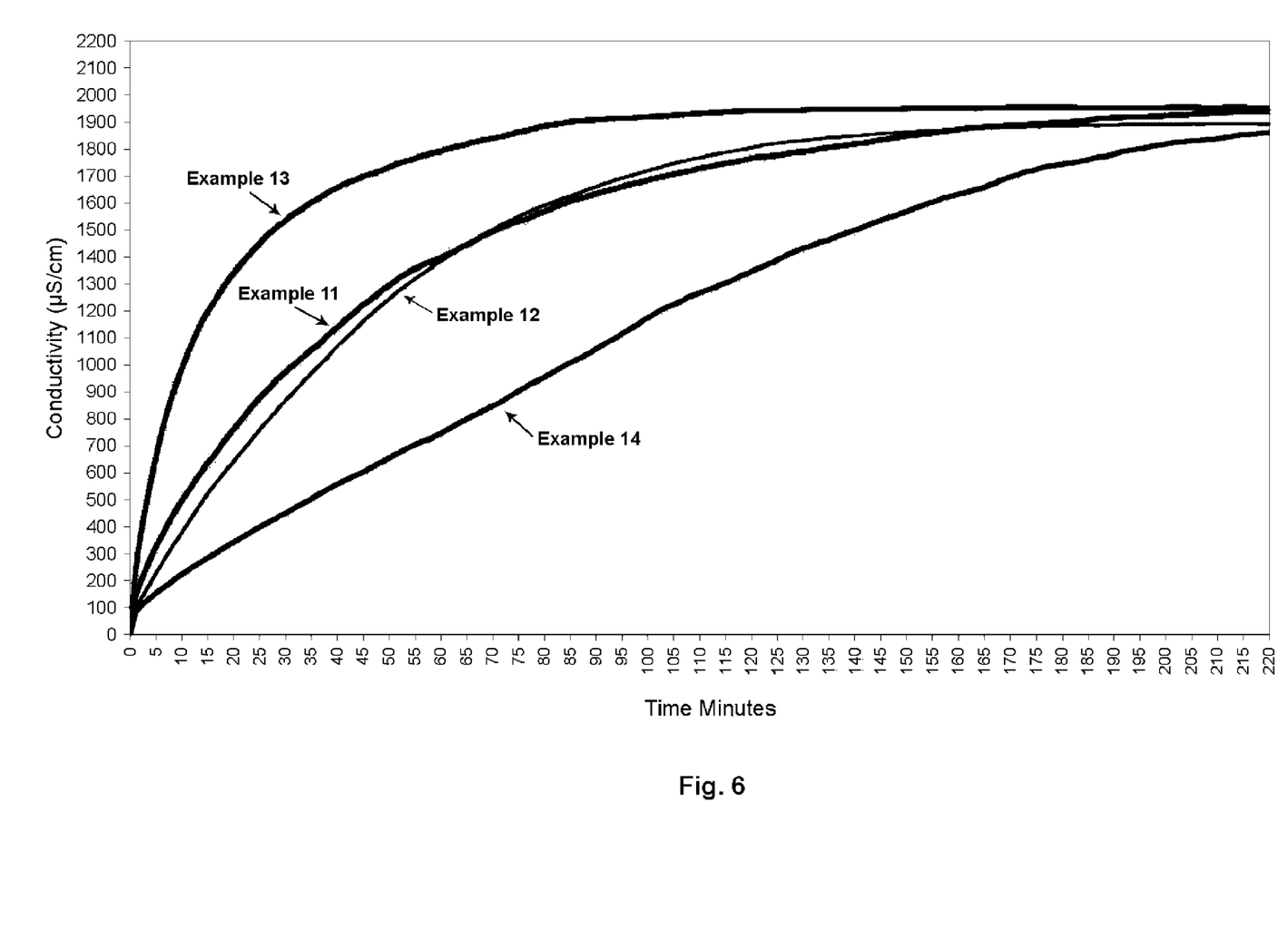

FIG. 6 graphically illustrates the dissolution profile of sodium silicate-coated sodium percarbonate granules obtained from full scale trials of Examples 11, 12, 13 and 14 at about 20° C. as a function of time. The results clearly show that the dissolution time of sodium percarbonate is significantly extended when coated with a sodium silicate coating.

Examples 15 and 16

Use of Coated Sodium Percarbonate in Oilfield Applications

Example 15

In this example, coating stability of sodium silicate-coated sodium percarbonate and its degradation capability of guar was analyzed during 60 minutes for an oil well pumping simulation. In a 2-L vessel, 1000 g of deionized water was added to 10 g of an anionic carboxymethyl hydroxypropyl guar commercially obtained from Hercules, incorporated under the trade name Aqualon Galactasol 651 and stirred for about 30 min at 3000 rpm to form a stock solution. To 175 g of the stock solution, 0.8 g of a titanium based crosslinker commercially available from E.I. du Pont de Nemours and Company under the trade name Tyzor® 131 was added, stirred at 1500 rpm for about 2 minutes and allowed to gel for about 30 minutes. Using a Grace M3500A rotary viscometer equipped with an R1 rotor and a B2 bob, the gel was pres-heared at 75.4 s$^{-1}$ at a predefined temperature for 30 min and then sheared for 30 s at 3.77 s$^{-1}$ to measure the initial gel viscosity. Next, a predefined amount of breaker was added, and the gel was sheared at 75.4 s$^{-1}$ for 60 minutes, with 30-second breaks at 3.77 s$^{-1}$ to measure the viscosity after 1, 3, 5, 7, 10, 15, 20, 25, 30, 35, 40, 45, 50, 55, and 60 minutes. The parameters for each test are provided in Table 4.

TABLE 4

| BREAKER CONCENTRATION (wt % sodium percarbonate actives) | TEMP. (° C.) | Na$_2$SiO$_3$ (wt %) |
|---|---|---|
| 1 | 0.05 | 24 | Uncoated |
| 2 | 0.5 | 24 | Uncoated |
| 3 | 0.275 | 56 | Uncoated |
| 4 | 0.05 | 88 | Uncoated |
| 5 | 0.5 | 88 | Uncoated |
| 6 | 0.275 | 24 | 10 |
| 7 | 0.05 | 24 | 30 |
| 8 | 0.5 | 24 | 30 |
| 9 | 0.275 | 55 | 30 |
| 10 | 0.05 | 88 | 30 |
| 11 | 0.5 | 88 | 30 |

Figure 1:
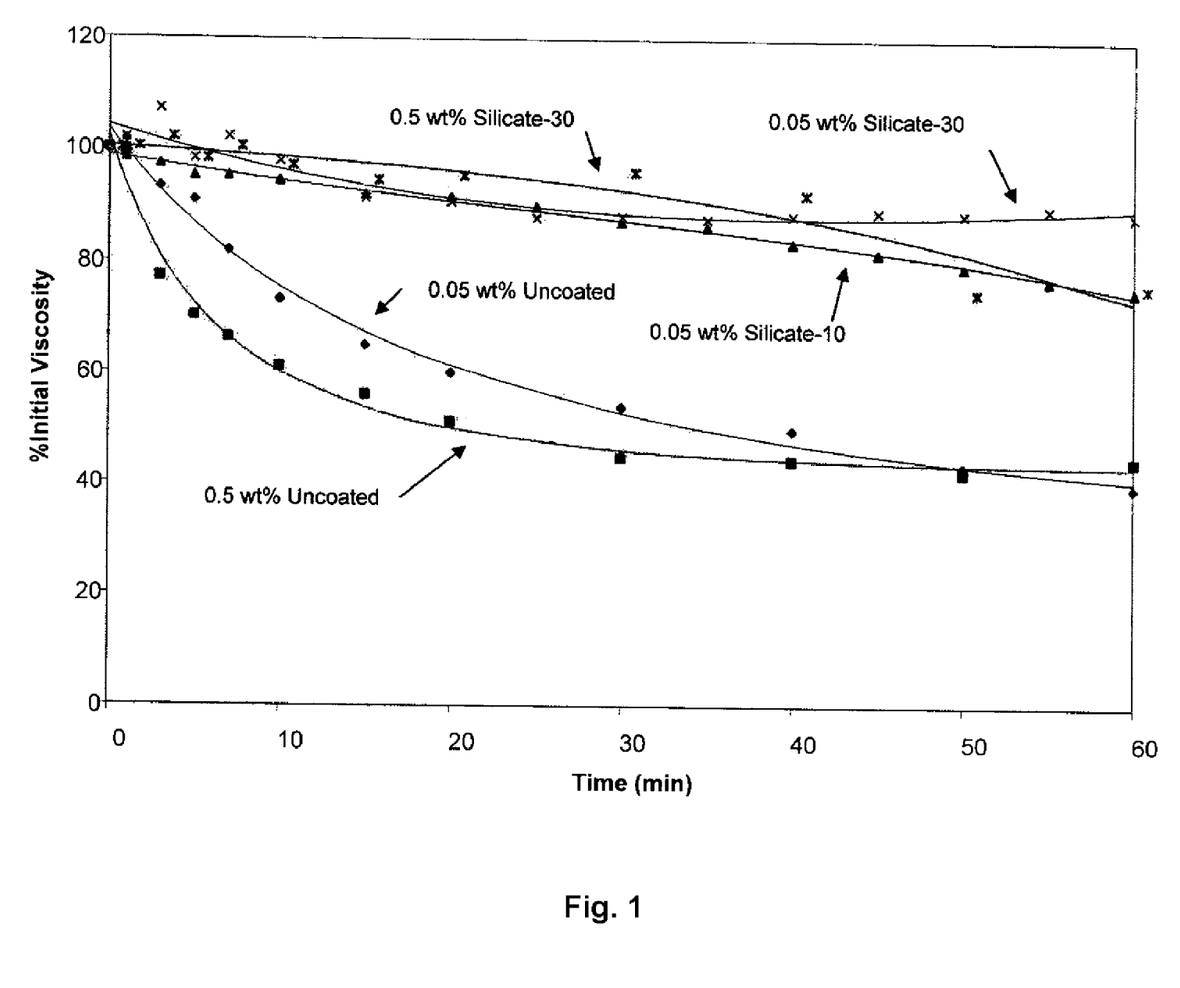
FIG. 1 graphically illustrates fluid viscosity at 24° C. as a function of time for various silicate-coated and uncoated sodium percarbonate granules, wherein the fluid included crosslinked guar.
Figure 2:
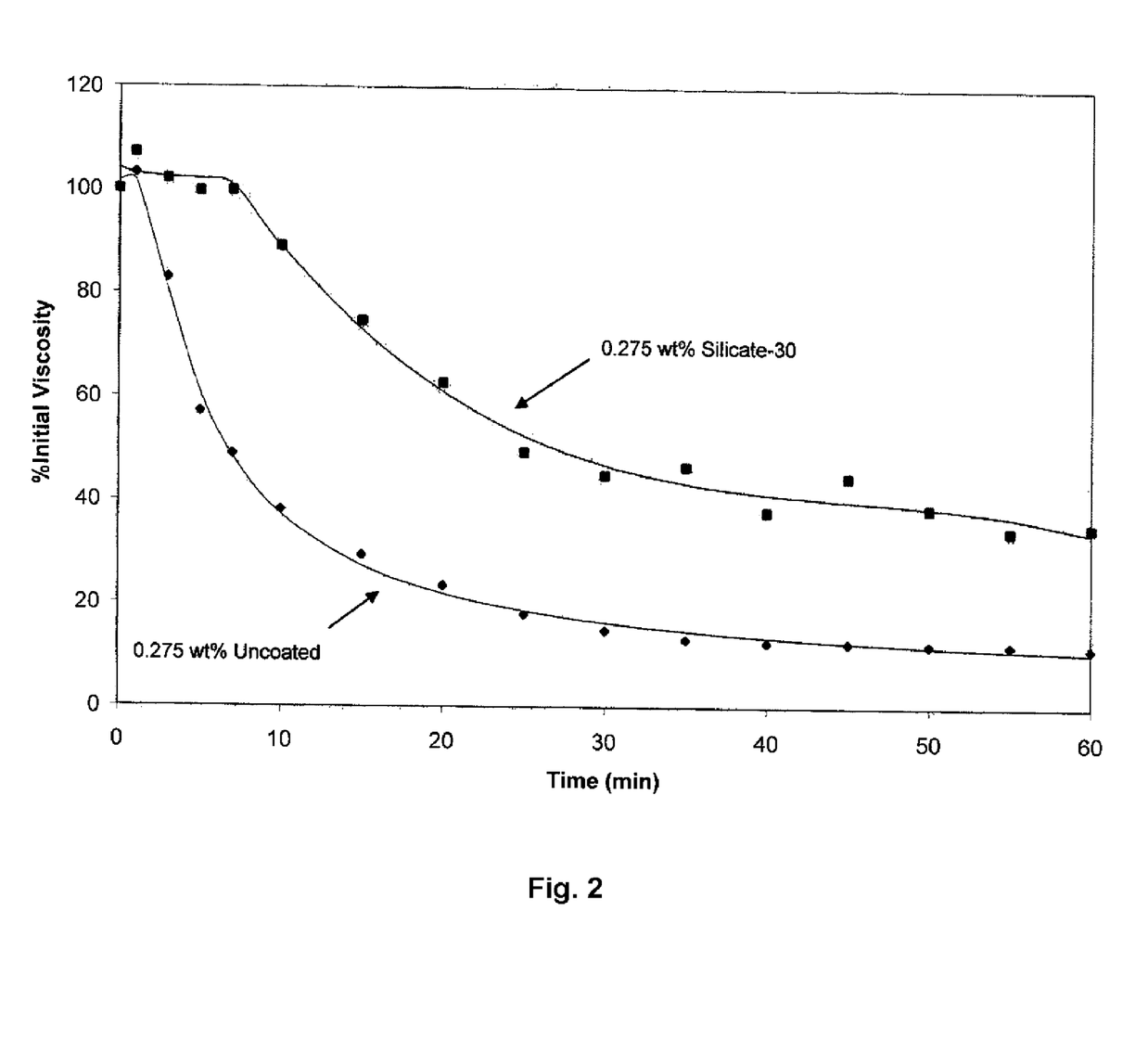
FIG. 2 graphically illustrates viscosity at 56° C. as a function of time comparing silicate coated sodium percarbonate granules and uncoated sodium percarbonate granules, wherein the fluid included crosslinked guar.
Figure 3:
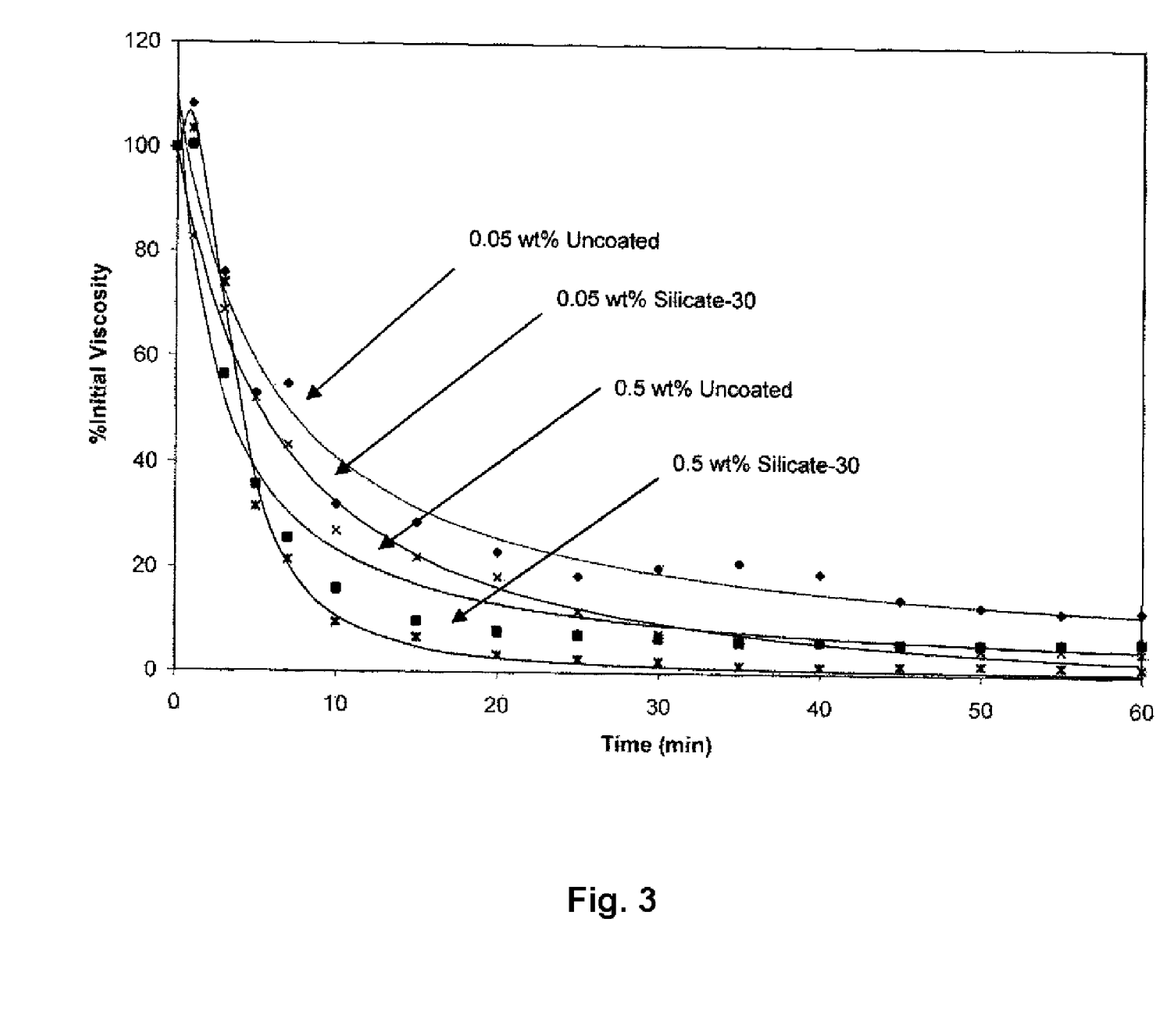
FIG. 3 graphically illustrates fluid viscosity at 88° C. as a function of time for various concentrations of silicate-coated sodium percarbonate granules and uncoated sodium percarbonate granules, wherein the fluid included crosslinked guar, FIG. 4 graphically illustrates the dissolution profile of Na silicate-coated sodium percarbonate granules at about 20° C. with different amounts of sodium silicate coating as a function of time, FIG. 5 graphically illustrates the dissolution profile of NaK silicate-coated sodium percarbonate granules at about 20° C. as a function of time, and FIG. 6 graphically illustrates the dissolution profile of Na silicate-coated sodium percarbonate granules obtained from full scale trials at about 20° C. as a function of time.

FIGS. 1-3 graphically illustrate viscosity as a function of time with all of the data for the above samples normalized as a percentage of initial viscosity. The room-temperature data as presented in FIG. 1 shows that both silicate-coated samples provided excellent stability relative to uncoated sodium percarbonate monitored at the same temperature. The 30 wt % sodium silicate-coated sodium percarbonate granules exhibited less release as a function of time than did the 10% sodium silicate-coated sodium percarbonate granules. At higher temperatures, however, the percarbonate released more rapidly into the gel as evidenced by the quicker reduction in viscosity and, when evaluated at 88° C., there is little difference between coated and uncoated samples.

Example 16

In this example, guar polymer degradation in the absence of shear was studied for various coated and uncoated sodium percarbonate granules. In a 2-L vessel, 1500 g deionized water was added to 15 g Aqualon Galactasol 651 guar polymer and stirred for 30 minutes at 3000 rpm to form a stock solution of the guar polymer. The guar polymer was not crosslinked. A 300 g portion of the stock solution was poured into a 400-mL vessel. Half of this (150 mL) was poured into a pressurizable aging cell commercially available by Fann Instrument Company and various amounts of coated and uncoated sodium percarbonate were added as shown in Table 5. The remaining guar polymer solution (150 mL) was added to the cell, which was then sealed and pressurized. The aging cell was shaken three times to disperse the sodium percarbonate granules and placed in an oven for a period of time as defined in Table 6. Afterward, viscosity was measured at 3.77 s$^{-1}$ at 24° C. on a Grace M3500a viscometer equipped with an R1 rotor and a B2 bob. The temperatures and pressures used were chosen to simulate depths varying between 150 and 760 m, and the time was varied between 4 and 28 hours. The temperature and pressures used to simulate different oil well depths are provided in Table 5, while Table 6 provides the experimental conditions and results for each sample.

TABLE 5

| DEPTH (m) | TEMP. (° C.) | PRESSURE (MPa) |
|---|---|---|
| 150 | 28 | 1.72 |
| 760 | 45 | 8.62 |

TABLE 6

| | CONCENTRATION (wt % sodium percarbonate actives) | DEPTH (m) | TIME (h) | Na$_2$SiO$_3$ (wt %) | VISCOSITY at 3.77 s$^{-1}$ (cP ± 80 cP) |
|---|---|---|---|---|---|
| 1 | 0.05 | 150 | 4 | Uncoated | 4395 |
| 2 | 0.5 | 150 | 4 | Uncoated | 2996 |
| 3 | 0.05 | 150 | 28 | Uncoated | 3271 |
| 4 | 0.5 | 150 | 28 | Uncoated | 859 |
| 5 | 0.05 | 760 | 4 | Uncoated | 3291 |
| 6 | 0.5 | 760 | 4 | Uncoated | 1521 |
| 7 | 0.05 | 760 | 28 | Uncoated | 1576 |
| 8 | 0.5 | 760 | 28 | Uncoated | 920 |
| 9 | 0.05 | 150 | 4 | 30 | 5304 |
| 10 | 0.5 | 150 | 4 | 30 | 4827 |
| 11 | 0.05 | 150 | 28 | 30 | 3835 |
| 12 | 0.5 | 150 | 28 | 30 | 2630 |
| 13 | 0.05 | 760 | 4 | 30 | 3375 |
| 14 | 0.5 | 760 | 4 | 30 | 2956 |
| 15 | 0.05 | 760 | 28 | 30 | 1967 |
| 16 | 0.5 | 760 | 28 | 30 | 947 |

The results indicate that the 30 wt % sodium silicate-coated sodium percarbonate has an interesting profile for degrading the guar. At shallow depths and shorter times, the coated sodium silicate coated percarbonate showed much slower degradation than the uncoated sodium percarbonate, but at deeper conditions and longer times it degrades guar as well as uncoated sodium percarbonate. The greater speed of guar degradation results from the increased rate of sodium percarbonate decomposition at elevated temperatures. This causes pressure to rapidly rise inside the coating, eventually cracking it from the inside and allowing sodium percarbonate to escape into the guar before the coating is dissolved. However, the temperature of the guar only slowly rises from the surface temperature as it is pumped down hole and subsequently heated at the bottom of a well.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A process for the production of a granule of a coated oxidizing compound suitable for delayed release comprising:
   a) providing cores of an oxidizing compound produced by fluidized bed spray granulation,
   b) spraying on the oxidizing compound cores an aqueous solution of metal silicate in a fluidized bed, said aqueous solution comprising at least 15% by weight metal silicate, and wherein the metal silicate is an alkali metal silicate, an alkaline earth metal silicate, an aluminum metal silicate, or a mixture of two or more of these silicates, and
   c) drying to form a metal silicate coating layer on the oxidizing compound core to form the granule of the coated oxidizing compound, provided that the amount of the metal silicate coating layer is at least 8% by weight based on the total weight of the granule.

2. The process according to claim 1, wherein the drying is effected in the fluidized bed.

3. The process according to claim 1, wherein the oxidizing compound comprises a peroxygen compound selected from the group consisting of perbromate, percarbonate, perborate, perphosphate, persulfate, and persilicate salts, and organic peroxides.

4. The process according to claim 3, wherein the oxidizing compound comprises perbromate salts, percarbonate salts, perborate salts, perphosphate salts, persulfate salts and persilicate salts, wherein the salts are alkali metal salts.

5. The process according to claim 1, wherein the metal silicate coating layer consists of metal silicate.

6. The process according to claim 1, wherein the metal silicate coating layer is an amount from 8 to 40% by weight based on the total weight of the granule.

7. The process according to claim 1, wherein the aqueous solution of metal silicate is at a concentration from 15% by weight metal silicate up to a saturation concentration of the solution.

8. The process according claim 1, wherein a fluidized bed temperature during spraying and drying is at least 50° C.

9. The process according to claim 1, wherein a temperature of the aqueous solution of metal silicate to be sprayed is between ambient and 70° C.

10. The process according to claim 1, wherein the metal silicate is a sodium silicate or a potassium silicate or a mixture thereof.

11. The process according to claim 1, wherein the oxidizing compound core has a particle size of 0.3 to 3 mm.

12. The process according to claim 1, wherein spraying the aqueous solution of metal silicate on the oxidizing compound cores is continuous.

13. A granule of the coated oxidizing compound produced by the process of claim 1.

14. The granule according to claim 13 comprising the coating layer containing the metal silicate in an amount of at least 10% by weight based on the total weight of the granule.

15. The granule according to claim 14, wherein the metal silicate is sodium silicate, potassium silicate, or a mixture thereof.

16. The process according to claim 1, wherein spraying the aqueous solution of metal silicate on the oxidizing compound cores is by batch.

17. A well treatment fluid, comprising:
   at least one hydratable polymer;
   a crosslinker for adjusting a viscosity of the fluid; and
   granules of an oxidizing compound having a delayed release metal silicate coating layer, said metal silicate coating layer is at least 8% by weight based on the total weight of each granule.

18. The fluid according to claim 17, wherein the at least one hydratable polymer comprises a polysaccharide, a polyacrylamide, a polyvinylalcohol, or a mixture thereof.

19. The fluid according to claim 17, wherein the crosslinker comprises a titanate, a borate, a zirconium-containing compound, a dialdehyde or a mixture thereof.

20. The fluid according to claim 17, wherein the fluid has a pH from 5 to 12.

21. The fluid according to claim 17, wherein the granules are configured to provide a dissolution rate at up to about 3 hours at a neutral pH.

22. The fluid according to claim 17, further comprising a proppant.

23. The fluid according to claim 17, wherein the polysaccharide comprises a guar gum or a guar gum derivative.

24. A process for fracturing a subterranean formation comprising:

injecting under pressure an aqueous hydraulic fluid having a first viscosity into a well bore, wherein the aqueous hydraulic fluid is a well treatment fluid comprising at least one hydratable polymer; a crosslinker for adjusting a viscosity of the fluid; and granules of an oxidizing compound having a delayed release metal silicate coating layer, said metal silicate coating layer is at least 8% by weight based on the total weight of each granule;

forming fractures in the subterranean formation with the hydraulic fluid at the first viscosity and dissolving the granules after a period of time;

decreasing the first viscosity to a second viscosity with the dissolved granules; and recovering at least a portion of the hydraulic fluid having the second viscosity.

* * * * *